United States Patent
Freund et al.

(10) Patent No.: US 10,268,475 B1
(45) Date of Patent: Apr. 23, 2019

(54) NEAR-ZERO DOWNTIME CUSTOMIZING CHANGE

(71) Applicant: SAP SE, Walldorf (DE)

(72) Inventors: Barbara Freund, Malsch (DE); Wulf Kruempelmann, Altlussheim (DE)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 15/980,368

(22) Filed: May 15, 2018

(51) Int. Cl.
| | |
|---|---|
| *G06F 9/44* | (2018.01) |
| *G06F 8/656* | (2018.01) |
| *G06F 8/61* | (2018.01) |
| *G06F 17/30* | (2006.01) |
| *G06F 11/36* | (2006.01) |
| *G06F 8/71* | (2018.01) |

(52) U.S. Cl.
CPC .............. *G06F 8/656* (2018.02); *G06F 8/61* (2013.01); *G06F 8/71* (2013.01); *G06F 11/3668* (2013.01); *G06F 17/30297* (2013.01)

(58) Field of Classification Search
None
See application file for complete search history.

(56) References Cited

U.S. PATENT DOCUMENTS

| | | | |
|---|---|---|---|
| 6,868,427 B2 | 3/2005 | Herzog et al. | |
| 8,230,006 B2 * | 7/2012 | Landry | ............... H04L 41/0816 709/201 |
| 8,332,462 B2 | 12/2012 | Kruempelmann | |
| 8,572,156 B2 | 10/2013 | Kruempelmann et al. | |
| 8,572,565 B2 | 10/2013 | Bozak et al. | |
| 8,924,530 B2 | 12/2014 | Kruempelmann | |
| 9,201,700 B2 | 12/2015 | Kruempelmann | |
| 9,430,219 B2 | 8/2016 | Kruempelmann et al. | |
| 9,792,342 B2 | 10/2017 | Kruempelmann | |
| 9,870,542 B2 | 1/2018 | Kruempelmann et al. | |
| 2013/0117710 A1 | 5/2013 | Walter et al. | |
| 2014/0149568 A1 | 5/2014 | Kruempelmann et al. | |

* cited by examiner

*Primary Examiner* — Qamrun Nahar
(74) *Attorney, Agent, or Firm* — Fish & Richardson P.C.

(57) ABSTRACT

The disclosure generally describes methods, software, and systems for completing near-zero downtime system upgrades. A new access schema for a new version of a system is created and stored. The system uses an existing access schema corresponding to a current version of the system. For the new version of the system, a shadow client is created that includes customizations and read-only views to master data and application data. Projection views into the new access schema are created from the shadow client. Using the new access schema and the shadow client, customization changes to the master and application data are automatically performed and stored at the shadow client. Upon receiving a request to switch to the new version of the system, the virtual transport is imported to a shadow-phase of the production client. The production client is switched to begin using the new access schema.

20 Claims, 4 Drawing Sheets

NEAR-ZERO DOWNTIME CUSTOMIZING CHANGE

BACKGROUND

The present disclosure relates to performing system updates in a way that limits down time. For example, Cloud-based business systems require software changes without interruption of the user access to the system. A given software change can include, for example, updated software (including application code), updated database structures (for an underlying database system), and configuration changes for actual system data configuration schema, such as for a process configuration.

SUMMARY

This disclosure generally describes computer-implemented methods, software, and systems for completing a near-zero downtime upgrade to a system. One computer-implemented method includes: creating and storing a new access schema for a new version of a system currently in use by users, the system executing on a production client and using an existing access schema corresponding to a current version of the system; creating, for the new version of the system, a shadow client including customizations and read-only views to master data and application data of the system; creating projection views from the shadow client into the new access schema; automatically performing, using the new access schema and the shadow client, customization changes to the master data and the application data; storing, at the shadow client, the customization changes to a virtual transport; and upon receiving a transport request to switch to the new version of the system, importing the virtual transport to a shadow-phase of the production client and switching the production client to begin using the new access schema.

The foregoing and other implementations can each optionally include one or more of the following features, alone or in combination. In particular, one implementation can include all the following features:

In a first aspect, combinable with any of the previous aspects, further comprising executing automated tests against live production data of the system to assure that schema customization changes are compatible with existing production data.

In a second aspect, combinable with any of the previous aspects, wherein the automated tests include triggers installed for tables that change during the automated tests, the triggers used to obtain information about data changes in the tables.

In a third aspect, combinable with any of the previous aspects, wherein the transport request includes information that identifies customizations made to the existing access schema to create the new access schema.

In a fourth aspect, combinable with any of the previous aspects, wherein switching the production client to begin using the new access schema comprises: stopping current calculations made by software using the existing access schema and stopping an application server of the system; changing read-only views from the system data to normal identity views and changing a client field in the view; stopping customer access to the existing access schema; handling the transport request, including importing the information that identifies customizations made to the existing access schema to create the new access schema; and switching customer access to the new access schema and starting the application server.

In a fifth aspect, combinable with any of the previous aspects, wherein importing the information includes importing information regarding configuration changes as atomic objects.

In a sixth aspect, combinable with any of the previous aspects, wherein the system is part of a multi-client environment that uses a client field to differentiate datasets in the database, and wherein importing the virtual transport to the shadow-phase of the production client and switching the production client to begin using the new access schema includes using database identity views to separate database tables from the access layer.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

This disclosure generally describes computer-implemented methods, software, and systems for completing a near-zero downtime upgrade to a system. For example, techniques can include the use of database union view technology and client replication tools for creating a separate upgrade environment for system data configuration. In this way, a new system data configuration can be calculated during an uptime of the system. Conventional approaches may deal with software changes using similar technologies, but the conventional approaches do not handle updates to system data configuration. This is because an additional layer of data separation is needed, which can be done as described in the present disclosure using a virtual client within an application programming system. Although zero downtime techniques are available to update software and database structures, conventional change processes can require a recalculation of process relationships to use updated system data configuration schema.

Techniques that are described in the present disclosure may make the following assumptions in some instances. First, changes to the configuration data can be imported into the system as atomic objects so that a determination can be made regarding which database objects are affected. Second, a multi-client environment can be used, including the use of a client field to differentiate datasets in the database. For example, a software upgrade tool can use a virtualization layer, including the use of database identity views to separate the database tables from the access layer.

After a software change is initiated, near-zero downtime approach can be used to update the software. The approach can include the use of a special mode in which a separate application server is used for the upgrade, allowing existing system data to remain in the normal environment. As a result, a user can access the system as usual via his own application server, as the upgrade process uses an additional server.

After an exchange occurs of the software and metadata for the configuration change is imported, the configuration update can begin. First, metadata of changed configuration template data can be collected. The metadata can contain or identify the database tables and metadata atoms for the new configuration. Table names can be collected, and the content of these tables can be copied to a different client. For other tables, a link to the upgrade access layer can be changed to read the data from the other client using a read-only view.

Using the application server for the upgrade, which accesses the new software together with the read-only views to the system data, the new system data configuration can be calculated. The new system data configuration can be based on the customers' system-related decisions, and metadata for the new system data configuration can exist on the new client in parallel to the normal work of the customer in an existing application server. Changes made during calculating the new customizing can be stored in a transport request that is subsequently used to transition the configuration into the normal system database.

During and after the determination of the new system data configuration, automated tests can be run against live production data to assure, for example, that the new customization is compatible to the existing production data. In some implementations, database triggers can be installed for specific tables that may change during the determination. The triggers can be used to obtain information about data changes that are not obtainable elsewhere.

After the determination of the new system data configuration is complete and tests are run, a switch can occur in which the new configuration is applied to (or installed in) the productive environment. Switching to the new configuration can include various operations, for example: 1) stopping any current calculations in the software change access schema and stopping the application server; 2) changing the read-only views from the system data to normal identity views and changing the client field in the view; 3) stopping customer access to the old access schema (which starts the near-zero downtime period); 4) handling the transport request and importing the data into the client; 5) switching the customer access to the new access schema; and 6) starting customer access to the new access schema (which ends the near-zero downtime period). In some cases, the near-zero downtime can be less than five minutes while assuring a stable software change.

Figure 1:
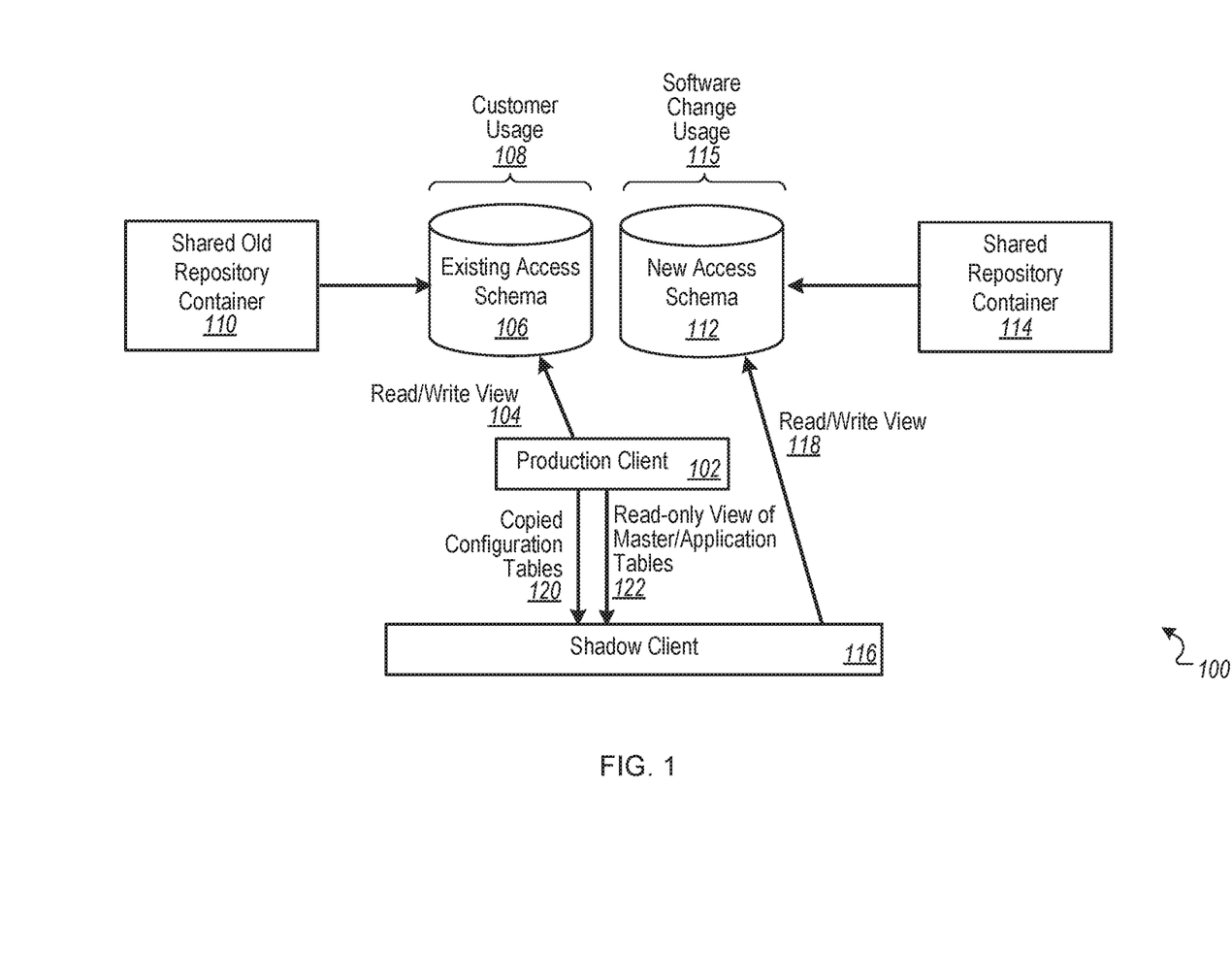
FIG. 1 is a block diagram of an example environment for preparing for an installation of a new system data configuration.

FIG. 1 is a block diagram of an example environment 100 for preparing for an installation of a new system data configuration. The environment 100 includes a production client 102 that has a read/write view 104 of an existing access schema 106. The existing access schema 106 is used by customers under a customer usage 108 for accessing a shared old repository container 110 that includes the current project information. The purpose of preparing for the installation of the new system data configuration is to begin using a new access schema 112 for accessing information in a shared repository container 114. In some implementations, a system configuration can be a process configuration, such as a business process configuration.

The preparation of the installation can occur under a software change usage 115 in which software engineers can prepare the new access schema 112 without interrupting the use of the existing access schema 106 by customers within the customer usage 108. The preparation of the installation can include the creation of a shadow client 116 that is, initially, a copy of the production client 102. The shadow client 116 can have a read/write view 118 of the new access schema 112. The preparation can include populating the shadow client 116 with copied configuration tables 120 that are copied from the production client 102. The preparation can also include providing the shadow client 116 with a read-only view of master/application tables 122. After the shadow client 116 is populated with the copied configuration tables 120 and the read-only view of master/application tables 122 is provided, then the software engineers can make any necessary changes to the new access schema 112 that are needed before installing the new access schema 112.

Figure 2:
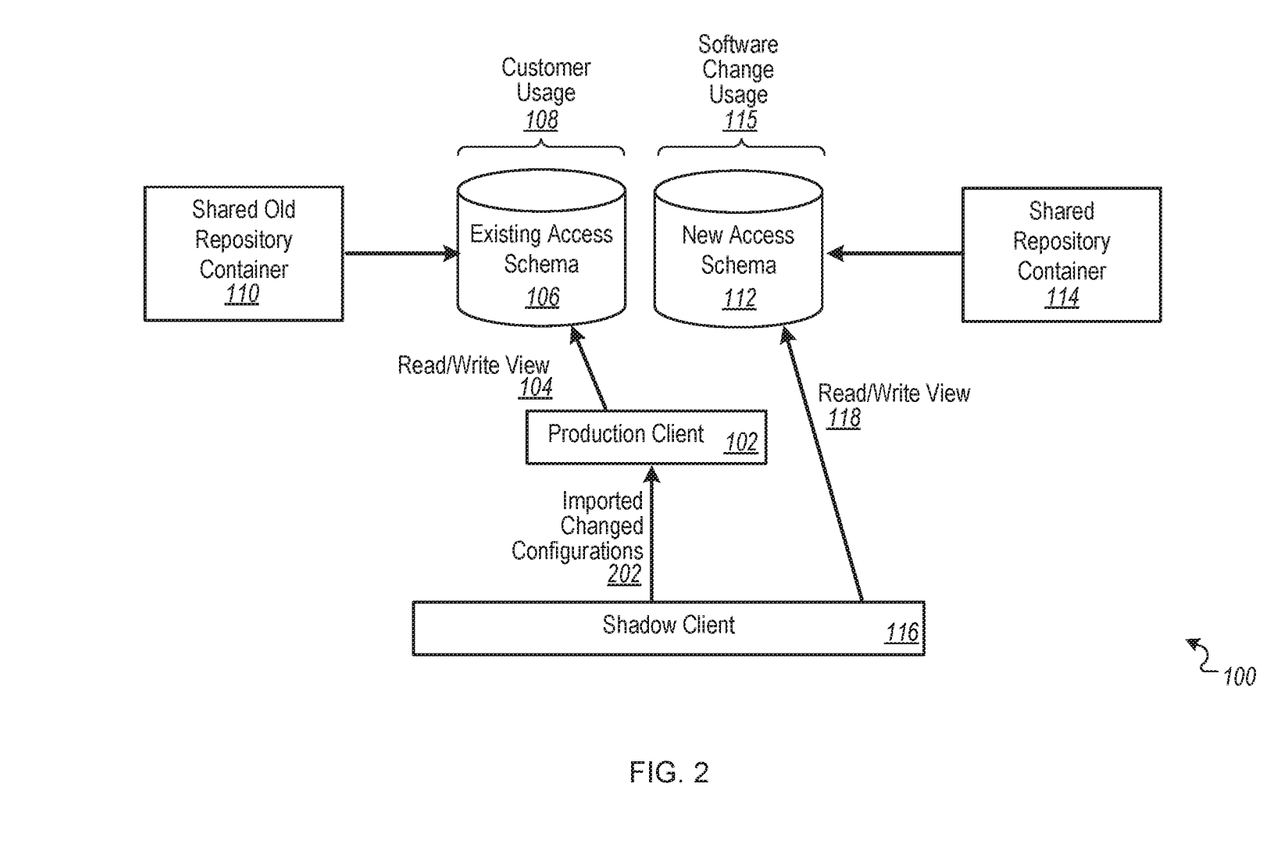
FIG. 2 is a block diagram of the example environment during execution of the installation of the new system data configuration.

FIG. 2 is a block diagram of the example environment 100 during execution of the installation of the new system data configuration. During the installation, the production client 102 receives imported changed configurations 202 from the shadow client 116. The importing can occur, for example, after: 1) stopping any current calculations in the software change access schema, and stopping the application server; 2) changing the read-only views from system data to normal identity views, and changing the client field in the view; 3) stopping customer access to the old access schema (which starts the near-zero downtime period); and 4) handling the transport request and importing the data into the client. After the imported changed configurations 202 (for example, as identified in the transport request) are received, the new system data configuration can be determined automatically based on the received information. The client field can serve a basis field in any table to enable multiple usage of a system.

Figure 3:
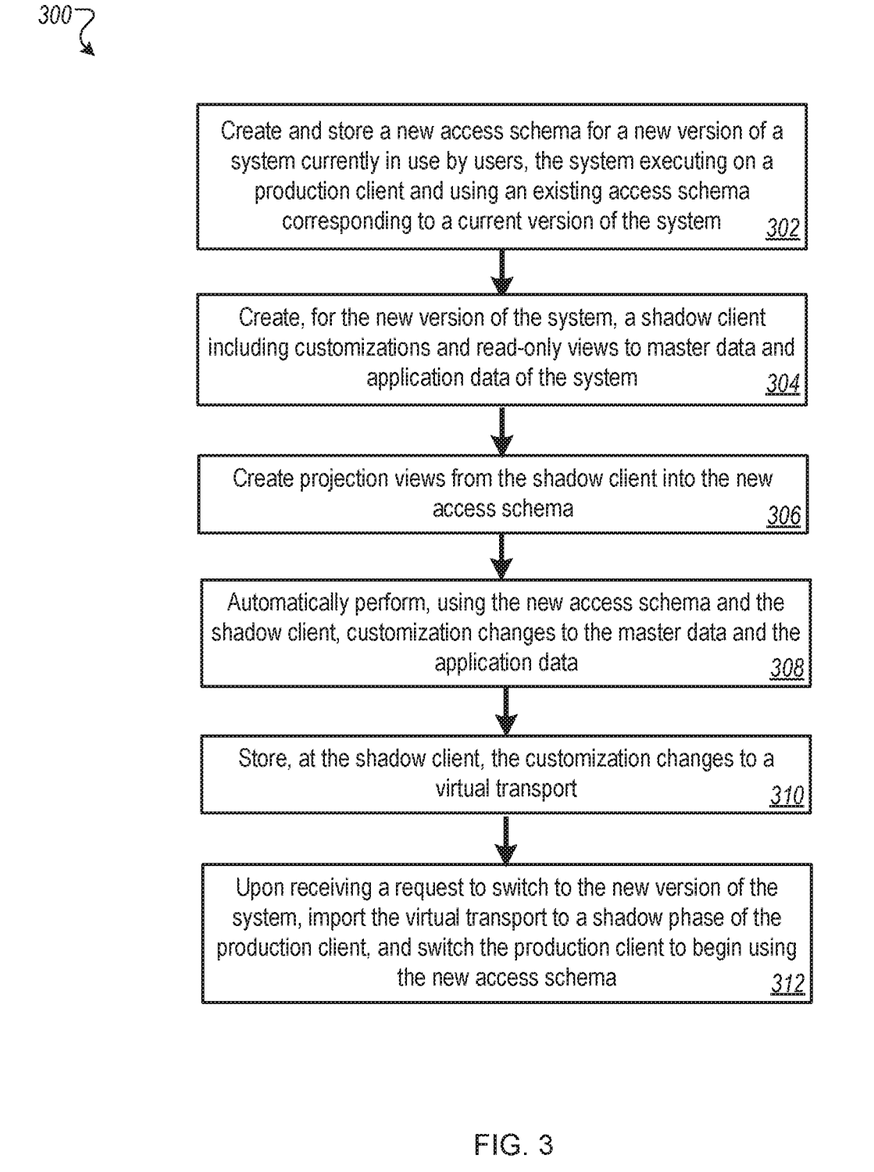
FIG. 3 is a flowchart of an example method for completing a near-zero downtime upgrade to a system.

FIG. 3 is a flowchart of an example method 300 for completing a near-zero downtime upgrade to a system. Method 300 can be performed by components of the environment 100. For clarity of presentation, the description that follows generally describes method 300 in the context of FIGS. 1 and 2.

At 302, a new access schema for a new version of a system currently in use by users is created and stored. The system executes on a production client and uses an existing access schema corresponding to a current version of the system. For example, the new access schema 112 can be created for a system in use by users currently using the existing access schema 106 that operates on production data used by a current version of the system.

At 304, a shadow client is created for the new version of the system. The shadow client includes customizations and read-only views to master data and application data of the system. As an example, the shadow client 116 can be prepared with copied configuration tables 120 that are copied from the production client 102. The shadow client 116 has the read-only view of master/application tables 122.

At 306, projection views are created from the shadow client into the new access schema. For example, the read/write view 118 provide the shadow client 116 with read/write access to the new access schema 112.

At 308, customization changes to the master data and the application data are automatically performed using the new access schema and the shadow client. As an example, one or more users using the shadow client 116 can make configuration changes to the new access schema 112. The one or more users can include software engineers and database administrators, for example.

At 310, the customization changes to a virtual transport are stored at the shadow client. The shadow client 116, for example, can store the configuration changes that have been made by the user to the new access schema 112.

At 312, upon receiving a request to switch to the new version of the system, the virtual transport is imported to a shadow-phase of the production client, and the production client is switched to begin using the new access schema. For example, referring to FIG. 2, when the production client 102 receives the imported change configurations 202, the production client 102 can be switched to the new access schema 112.

In some implementations, switching the production client to begin using the new access schema can include the following steps. First, current calculations can be stopped that are made by software using the existing access schema, and an application server of the system can be stopped. Second, read-only views from the system data can be changed to normal identity views, and a client field in the view can be changed. Third, customer access to the existing access schema can be stopped. Fourth, the transport request can be handled, including importing the information that identifies customizations made to the existing access schema to create the new access schema. Fifth, customer access can be switched to the new access schema, and the application server can be started.

Figure 4:
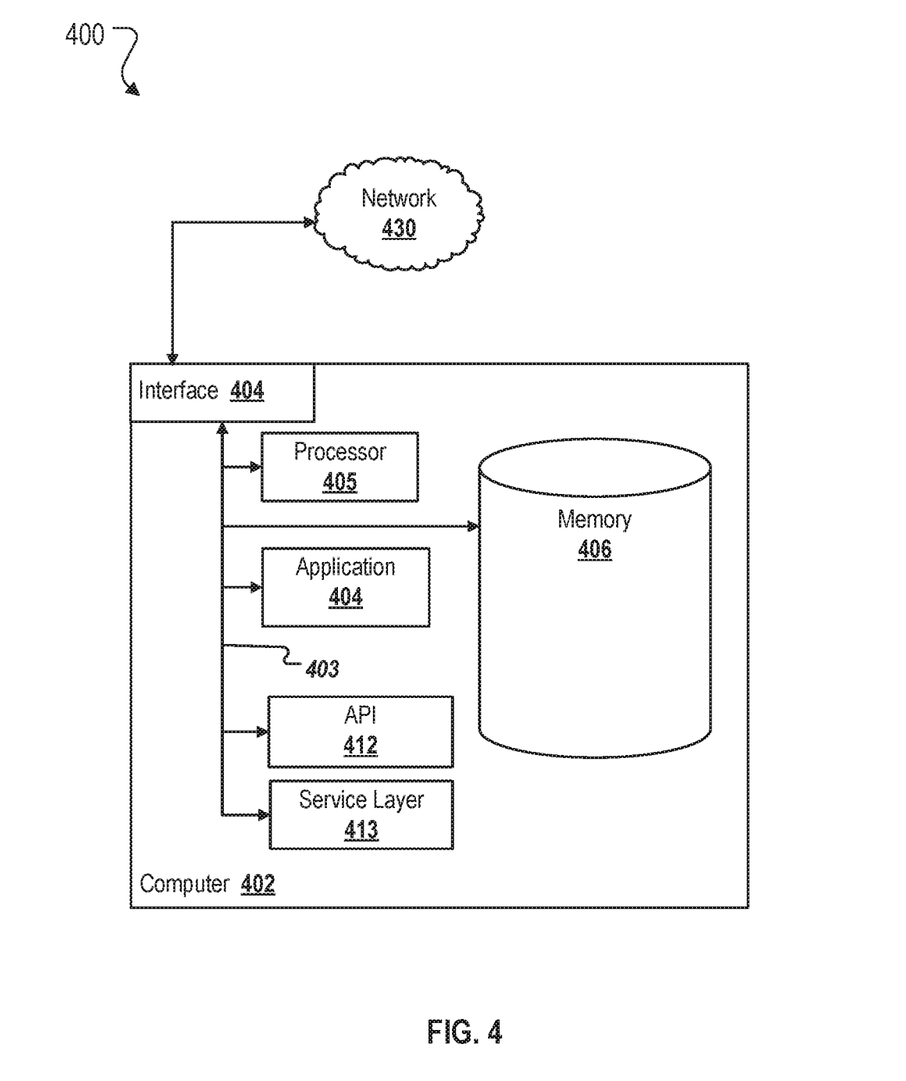
FIG. 4 is a block diagram of an exemplary computer system used to provide computational functionalities associated with described algorithms, methods, functions, processes, flows, and procedures as described in the instant disclosure.

FIG. 4 is a block diagram of an exemplary computer system 400 used to provide computational functionalities associated with described algorithms, methods, functions, processes, flows, and procedures as described in the instant disclosure.

The illustrated computer 402 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 402 may comprise a computer that includes an input device, such as a keypad, keyboard, touch screen, or other device that can accept user information, and an output device that conveys information associated with the operation of the computer 402, including digital data, visual, or audio information (or a combination of information), or a graphical user interface (GUI).

The computer 402 can serve in a role as a client, network component, a server, a database or other persistency, or any other component (or a combination of roles) of a computer system for performing the subject matter described in the instant disclosure. The illustrated computer 402 is communicably coupled with a network 430. In some implementations, one or more components of the computer 402 may be configured to operate within environments, including cloud-computing-based, local, global, or other environment (or a combination of environments).

At a high level, the computer 402 is an electronic computing device operable to receive, transmit, process, store, or manage data and information associated with the described subject matter. According to some implementations, the computer 402 may also include or be communicably coupled with an application server, e-mail server, web server, caching server, streaming data server, business intelligence (BI) server, or other server (or a combination of servers).

The computer 402 can receive requests over network 430 from a client application (for example, executing on another computer 402) and responding to the received requests by processing the said requests in an appropriate software application. In addition, requests may also be sent to the computer 402 from internal users (for example, from a command console or by other appropriate access method), external or third-parties, other automated applications, as well as any other appropriate entities, individuals, systems, or computers.

Each of the components of the computer 402 can communicate using a system bus 403. In some implementations, any or all of the components of the computer 402, both hardware or software (or a combination of hardware and software), may interface with each other or the interface 404 (or a combination of both) over the system bus 403 using an API 412 or a service layer 413 (or a combination of the API 412 and service layer 413). The API 412 may include specifications for routines, data structures, and object classes. The API 412 may be either computer-language independent or dependent and refer to a complete interface, a single function, or even a set of APIs. The service layer 413 provides software services to the computer 402 or other components (whether or not illustrated) that are communicably coupled to the computer 402. The functionality of the computer 402 may be accessible for all service consumers using this service layer. Software services, such as those provided by the service layer 413, provide reusable, defined business functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 or the service layer 413 as stand-alone components in relation to other components of the computer 402 or other components (whether or not illustrated) that are communicably coupled to the computer 402. Moreover, any or all parts of the API 412 or the service layer 413 may be implemented as child or sub-modules of another software module, enterprise application, or hardware module without departing from the scope of the instant disclosure.

The computer 402 includes an interface 404. Although illustrated as a single interface 404 in FIG. 4, two or more interfaces 404 may be used according to particular needs, desires, or particular implementations of the computer 402. The interface 404 is used by the computer 402 for communicating with other systems in a distributed environment that are connected to the network 430 (whether illustrated or not). Generally, the interface 404 comprises logic encoded in software or hardware (or a combination of software and hardware) and operable to communicate with the network 430. More specifically, the interface 404 may comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors may be used according to particular needs, desires, or particular implementations of the computer 402. Generally, the processor 405 executes instructions and manipulates data to perform the operations of the computer 402 and any algorithms, methods, functions, processes, flows, and procedures as described in the instant disclosure.

The computer 402 also includes a memory 406 that holds data for the computer 402 or other components (or a combination of both) that can be connected to the network 430 (whether illustrated or not). For example, memory 406 can be a database storing data consistent with this disclosure. Although illustrated as a single memory 406 in FIG. 4, two or more memories may be used according to particular needs, desires, or particular implementations of the computer 402 and the described functionality. While memory 406 is illustrated as an integral component of the computer 402, in alternative implementations, memory 406 can be external to the computer 402.

The application 407 is an algorithmic software engine providing functionality according to particular needs, desires, or particular implementations of the computer 402, particularly with respect to functionality described in this disclosure. For example, application 407 can serve as one or more components, modules, applications, etc. Further, although illustrated as a single application 407, the application 407 may be implemented as multiple applications 407 on the computer 402. In addition, although illustrated as integral to the computer 402, in alternative implementations, the application 407 can be external to the computer 402.

There may be any number of computers 402 associated with, or external to, a computer system containing computer 402, each computer 402 communicating over network 430. Further, the term "client," "user," and other appropriate terminology may be used interchangeably as appropriate without departing from the scope of this disclosure. Moreover, this disclosure contemplates that many users may use one computer 402, or that one user may use multiple computers 402.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communication between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a GUI. The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

The invention claimed is:
1. A computer-implemented method comprising:
creating and storing a new access schema for a new version of a system currently in use by users, the system executing on a production client and using an existing access schema corresponding to a current version of the system;

creating, for the new version of the system, a shadow client including customizations and read-only views to master data and application data of the system;
creating projection views from the shadow client into the new access schema;
automatically performing, using the new access schema and the shadow client, customization changes to the master data and the application data;
storing, at the shadow client, the customization changes to a virtual transport; and
upon receiving a transport request to switch to the new version of the system, importing the virtual transport to a shadow-phase of the production client and switching the production client to begin using the new access schema.

2. The computer-implemented method of claim 1, further comprising executing automated tests against live production data of the system to assure that schema customization changes are compatible with existing production data.

3. The computer-implemented method of claim 2, wherein the automated tests include triggers installed for tables that change during the automated tests, the triggers used to obtain information about data changes in the tables.

4. The computer-implemented method of claim 1, wherein the transport request includes information that identifies customizations made to the existing access schema to create the new access schema.

5. The computer-implemented method of claim 4, wherein switching the production client to begin using the new access schema comprises:
stopping current calculations made by software using the existing access schema and stopping an application server of the system;
changing read-only views from the system data to normal identity views and changing a client field in the view;
stopping customer access to the existing access schema;
handling the transport request, including importing the information that identifies customizations made to the existing access schema to create the new access schema; and
switching customer access to the new access schema and starting the application server.

6. The computer-implemented method of claim 5, wherein importing the information includes importing information regarding configuration changes as atomic objects.

7. The computer-implemented method of claim 1, wherein the system is part of a multi-client environment that uses a client field to differentiate datasets in the database, and wherein importing the virtual transport to the shadow-phase of the production client and switching the production client to begin using the new access schema includes using database identity views to separate database tables from the access layer.

8. A system comprising:
memory storing tables storing information for an existing access schema and a new access schema; and
a server performing operations comprising:
creating and storing the new access schema for a new version of a system currently in use by users, the system executing on a production client and using the existing access schema corresponding to a current version of the system;
creating, for the new version of the system, a shadow client including customizations and read-only views to master data and application data of the system;
creating projection views from the shadow client into the new access schema;
automatically performing, using the new access schema and the shadow client, customization changes to the master data and the application data;
storing, at the shadow client, the customization changes to a virtual transport; and
upon receiving a transport request to switch to the new version of the system, importing the virtual transport to a shadow-phase of the production client and switching the production client to begin using the new access schema.

9. The system of claim 8, the operations further comprising executing automated tests against live production data of the system to assure that schema customization changes are compatible with existing production data.

10. The system of claim 9, wherein the automated tests include triggers installed for tables that change during the automated tests, the triggers used to obtain information about data changes in the tables.

11. The system of claim 8, wherein the transport request includes information that identifies customizations made to the existing access schema to create the new access schema.

12. The system of claim 11, wherein switching the production client to begin using the new access schema comprises:
stopping current calculations made by software using the existing access schema and stopping an application server of the system;
changing read-only views from the system data to normal identity views and changing a client field in the view;
stopping customer access to the existing access schema;
handling the transport request, including importing the information that identifies customizations made to the existing access schema to create the new access schema; and
switching customer access to the new access schema and starting the application server.

13. The system of claim 12, wherein importing the information includes importing information regarding configuration changes as atomic objects.

14. The system of claim 8, wherein the system is part of a multi-client environment that uses a client field to differentiate datasets in the database, and wherein importing the virtual transport to the shadow-phase of the production client and switching the production client to begin using the new access schema includes using database identity views to separate database tables from the access layer.

15. A non-transitory computer-readable media encoded with a computer program, the program comprising instructions that when executed by one or more computers cause the one or more computers to perform operations comprising:
creating and storing a new access schema for a new version of a system currently in use by users, the system executing on a production client and using an existing access schema corresponding to a current version of the system;
creating, for the new version of the system, a shadow client including customizations and read-only views to master data and application data of the system;
creating projection views from the shadow client into the new access schema;
automatically performing, using the new access schema and the shadow client, customization changes to the master data and the application data;
storing, at the shadow client, the customization changes to a virtual transport; and upon receiving a transport request to switch to the new version of the system, importing the virtual transport to a shadow-phase of the production client and switching the production client to begin using the new access schema.

16. The non-transitory computer-readable media of claim 15, the operations further comprising executing automated tests against live production data of the system to assure that schema customization changes are compatible with existing production data.

17. The non-transitory computer-readable media of claim 16, wherein the automated tests include triggers installed for tables that change during the automated tests, the triggers used to obtain information about data changes in the tables.

18. The non-transitory computer-readable media of claim 15, wherein the transport request includes information that identifies customizations made to the existing access schema to create the new access schema.

19. The non-transitory computer-readable media of claim 18, wherein switching the production client to begin using the new access schema comprises:
   stopping current calculations made by software using the existing access schema and stopping an application server of the system;
   changing read-only views from the system data to normal identity views and changing a client field in the view;
   stopping customer access to the existing access schema;
   handling the transport request, including importing the information that identifies customizations made to the existing access schema to create the new access schema; and
   switching customer access to the new access schema and starting the application server.

20. The non-transitory computer-readable media of claim 19, wherein importing the information includes importing information regarding configuration changes as atomic objects.

* * * * *